(12) United States Patent
Ling et al.

(10) Patent No.: US 12,095,779 B2
(45) Date of Patent: *Sep. 17, 2024

(54) REASSEMBLY FREE DEEP PACKET INSPECTION FOR PEER TO PEER NETWORKS

(71) Applicant: SONICWALL US HOLDINGS INC., Milpitas, CA (US)

(72) Inventors: Hui Ling, Shanghai (CN); Cuiping Yu, Shanghai (CN); Zhong Chen, Fremont, CA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,669

(22) Filed: Jun. 28, 2023

(65) Prior Publication Data

US 2023/0336570 A1     Oct. 19, 2023

Related U.S. Application Data

(63) Continuation of application No. 17/174,182, filed on Feb. 11, 2021, now Pat. No. 11,695,784, which is a (Continued)

(51) Int. Cl.
*H04L 9/40* (2022.01)
*H04L 67/104* (2022.01)

(52) U.S. Cl.
CPC ...... *H04L 63/1408* (2013.01); *H04L 63/0254* (2013.01); *H04L 63/168* (2013.01); (Continued)

(58) Field of Classification Search
CPC ............ H04L 63/1408; H04L 63/0254; H04L 63/168; H04L 63/0245; H04L 63/1416; H04L 67/104

See application file for complete search history.

(56) References Cited

U.S. PATENT DOCUMENTS 6,961,783 B1  11/2005  Cook et al.
7,206,765 B2   4/2007  Gilliam et al.
(Continued)

FOREIGN PATENT DOCUMENTS

EP    2901391 A1   8/2018
WO  2006052714 A2   5/2006

OTHER PUBLICATIONS

U.S. Appl. No. 14/965,866 Office Action May 18, 2017.
(Continued)

*Primary Examiner* — Techane Gergiso
(74) *Attorney, Agent, or Firm* — Polsinelli LLP

(57) ABSTRACT

The present disclosure relates to a system, a method, and a non-transitory computer readable storage medium for deep packet inspection scanning at an application layer of a computer. A method of the presently claimed invention may scan pieces of data received out of order without reassembly at an application layer from a first input state generating one or more output states for each piece of data. The method may then identify that the first input state includes one or more characters that are associated with malicious content. The method may then identify that the data set may include malicious content when the first input state combined with one or more output states matches a known piece of malicious content.

21 Claims, 5 Drawing Sheets

Related U.S. Application Data continuation of application No. 16/853,360, filed on Apr. 20, 2020, now Pat. No. 11,005,858, which is a continuation of application No. 15/860,623, filed on Jan. 2, 2018, now Pat. No. 10,630,697, which is a continuation of application No. 14/965,866, filed on Dec. 10, 2015, now Pat. No. 9,860,259.

(52) U.S. Cl.
CPC ...... *H04L 63/0245* (2013.01); *H04L 63/1416* (2013.01); *H04L 67/104* (2013.01)

(56) References Cited

U.S. PATENT DOCUMENTS

| | | |
|---|---|---|
| 7,849,502 B1 | 12/2010 | Bloch et al. |
| 7,849,507 B1 | 12/2010 | Bloch et al. |
| 7,984,149 B1 | 7/2011 | Grayson |
| 8,316,446 B1 | 11/2012 | Campbell et al. |
| 8,320,372 B2 | 11/2012 | Menten |
| 8,352,998 B1 | 1/2013 | Kougiouris et al. |
| 8,578,489 B1 | 11/2013 | Dubrovsky et al. |
| 8,782,771 B2 | 7/2014 | Chen et al. |
| 8,813,221 B1 | 8/2014 | Dubrovsky et al. |
| 8,826,443 B1 | 9/2014 | Raman et al. |
| 8,850,567 B1 | 9/2014 | Hsieh et al. |
| 8,856,869 B1 | 10/2014 | Brinskelle |
| 9,031,937 B2 | 5/2015 | Guha |
| 9,350,750 B1 | 5/2016 | Aval et al. |
| 9,438,699 B1 | 9/2016 | Shetty et al. |
| 9,557,889 B2 | 1/2017 | Raleigh et al. |
| 9,723,027 B2 | 8/2017 | Vazquez Carames |
| 9,860,259 B2 | 1/2018 | Ling et al. |
| 9,923,870 B2 | 3/2018 | Dusi et al. |
| 10,277,610 B2 | 4/2019 | Dubrovsky et al. |
| 10,491,566 B2 | 11/2019 | Vazquez Carames |
| 10,630,697 B2 | 4/2020 | Ling et al. |
| 11,695,784 B2 | 7/2023 | Ling et al. |
| 2004/0179477 A1 | 9/2004 | Lincoln et al. |
| 2005/0108518 A1 | 5/2005 | Pandya |
| 2006/0233101 A1 | 10/2006 | Luft et al. |
| 2007/0041402 A1 | 2/2007 | Sekaran et al. |
| 2007/0064702 A1 | 3/2007 | Bates et al. |
| 2007/0192861 A1* | 8/2007 | Varghese ............ H04L 63/145 726/23 |
| 2007/0226362 A1* | 9/2007 | Johnson ............ H04L 69/161 709/230 |
| 2008/0127349 A1 | 5/2008 | Ormazabal et al. |
| 2008/0219169 A1* | 9/2008 | Sargor .............. H04L 43/026 370/238 |
| 2008/0235755 A1 | 9/2008 | Blaisdell et al. |
| 2008/0262991 A1 | 10/2008 | Kapoor et al. |
| 2008/0320582 A1 | 12/2008 | Chen et al. |
| 2009/0164560 A1 | 6/2009 | Fiatal |
| 2009/0260087 A1 | 10/2009 | Ishida et al. |
| 2009/0316698 A1 | 12/2009 | Menten |
| 2010/0005118 A1 | 1/2010 | Sezer |
| 2010/0172257 A1* | 7/2010 | Yu ................. H04L 47/10 370/252 |
| 2011/0013527 A1* | 1/2011 | Varadarajan ......... H04L 45/00 370/252 |
| 2011/0035469 A1 | 2/2011 | Smith et al. |
| 2011/0125748 A1 | 5/2011 | Wood et al. |
| 2011/0153802 A1* | 6/2011 | Steiner ............ G06F 16/245 709/224 |
| 2011/0211586 A1 | 9/2011 | Zhu |
| 2011/0219426 A1 | 9/2011 | Kim et al. |
| 2011/0231924 A1 | 9/2011 | Devdhar et al. |
| 2012/0144061 A1 | 6/2012 | Song |
| 2012/0230200 A1 | 9/2012 | Wentink |
| 2012/0240185 A1 | 9/2012 | Kapoor et al. |
| 2012/0291087 A1 | 11/2012 | Agrawal |
| 2012/0324099 A1 | 12/2012 | Perez Martinez et al. |
| 2013/0074177 A1 | 3/2013 | Varadhan et al. |
| 2013/0128742 A1 | 5/2013 | Yu |
| 2013/0167192 A1 | 6/2013 | Hickman et al. |
| 2013/0286860 A1 | 10/2013 | Dorenbosch et al. |
| 2013/0291107 A1 | 10/2013 | Marck et al. |
| 2014/0053239 A1 | 2/2014 | Narayanswamy |
| 2014/0157405 A1* | 6/2014 | Joll ............... H04L 63/1425 726/22 |
| 2014/0181972 A1 | 6/2014 | Karta et al. |
| 2014/0258456 A1 | 9/2014 | Lee et al. |
| 2014/0304766 A1 | 10/2014 | Livne |
| 2014/0359764 A1* | 12/2014 | Dubrovsky ........ H04L 63/1408 726/22 |
| 2015/0058488 A1 | 2/2015 | Backholm |
| 2015/0058916 A1 | 2/2015 | Rostami-Hesarsorkh et al. |
| 2015/0088897 A1 | 3/2015 | Sherman et al. |
| 2015/0278798 A1 | 10/2015 | Lerch et al. |
| 2015/0312220 A1 | 10/2015 | Crawford |
| 2015/0326613 A1 | 11/2015 | Devarajan et al. |
| 2015/0373167 A1 | 12/2015 | Murashov et al. |
| 2016/0036833 A1* | 2/2016 | Ardeli ............... H04L 63/101 726/22 |
| 2016/0056927 A1 | 2/2016 | Liu et al. |
| 2016/0057185 A1* | 2/2016 | Zhang ............... H04L 67/104 709/231 |
| 2016/0119198 A1 | 4/2016 | Kfir et al. |
| 2016/0127305 A1 | 5/2016 | Droms et al. |
| 2016/0164825 A1 | 6/2016 | Riedel et al. |
| 2016/0182537 A1 | 6/2016 | Tatourian et al. |
| 2016/0205072 A1 | 7/2016 | Dusi et al. |
| 2017/0048260 A1 | 2/2017 | Peddemors et al. |
| 2017/0099310 A1 | 4/2017 | Di Pietro et al. |
| 2017/0134428 A1 | 5/2017 | Vazquez Carames |
| 2017/0171222 A1 | 6/2017 | Ling et al. |
| 2017/0302628 A1 | 10/2017 | Vazquez Carames |
| 2018/0198804 A1 | 7/2018 | Ling et al. |
| 2020/0213278 A1 | 7/2020 | Vazquez Carames |
| 2020/0351280 A1 | 11/2020 | Ling et al. |
| 2021/0234873 A1 | 7/2021 | Ling et al. |

OTHER PUBLICATIONS

U.S. Appl. No. 15/860,623 Office Action Jun. 13, 2019.
U.S. Appl. No. 15/860,623 Final Office Action Nov. 27, 2018.
U.S. Appl. No. 15/860,623 Office Action May 3, 2018.
U.S. Appl. No. 17/174,182 Office Action Aug. 15, 2022.
U.S. Appl. No. 15/636,148 Office Action Feb. 19, 2019.
U.S. Appl. No. 15/636,148 Final Office Action Jul. 26, 2018.
U.S. Appl. No. 15/636,148 Office Action Feb. 22, 2018.
U.S. Appl. No. 16/697,082 Final Office Action Jan. 19, 2021.
U.S. Appl. No. 16/697,082 Office Action Oct. 6, 2020.

\* cited by examiner

Client Server
110

Peer to Peer
150

REASSEMBLY FREE DEEP PACKET INSPECTION FOR PEER TO PEER NETWORKS

CROSS-REFERENCE TO RELATED APPLICATIONS

This application is a continuation and claims the priority benefit of U.S. patent application Ser. No. 17/174,182 filed Feb. 11, 2021, now U.S. Pat. No. 11,695,784, which is a continuation and claims the priority benefit of U.S. patent application Ser. No. 16/853,360 filed Apr. 20, 2020, now U.S. Pat. No. 11,005,858, which is a continuation and claims the priority benefit of U.S. patent application Ser. No. 15/860,623 filed Jan. 2, 2018, now U.S. Pat. No. 10,630,697, which is a continuation and claims the priority benefit of U.S. patent application Ser. No. 14/965,866 filed Dec. 10, 2015, now U.S. Pat. No. 9,860,259, the disclosures of which are incorporated herein by reference.

BACKGROUND OF THE INVENTION

Field of the Invention

The present invention is generally directed to reassembly free scanning of files in a peer to peer network. More specifically, the present invention scans file data without reassembling a file even when parts of the file are received out of order.

Description of the Related Art

Data communicated over computer networks today pass through various layers in a computer system architecture. Typically data is received at a network interface of a computer at a link layer. The link layer is a layer in the architecture of a computer that includes physical hardware. The link layer connects the computer to other computers in a computer network. Link layers also are used to transmit data from one computer to another over a computer network.

Other layers above the link layer in computer system architectures commonly include a network layer, a transport layer, and an application layer. The network layer receives data packets from and provides data packets to the link layer. The network layer may also receive data in segments from the transport layer and send data in segments to the transport layer. Commonly when the network layer receives a segment of data from the transport layer it will generate a packet or an internet protocol (IP) datagram for transmission to another computer. This process may include encapsulating the segmented data received from the transport layer and adding a header that includes a destination IP address when generating an IP packet. In certain instances more than one IP packet may be associated with a data segment. The network layer may also receive IP packets from the link layer and may pass segmented data to the transport layer.

When a series of IP packets are used to transport data to a computer, those packets may be received out of order at the network layer. When this occurs, the transport layer may re-order the data segments from a plurality of packets before sending the re-ordered data to the application layer. Conventionally data received at an application layer must be received in-order (i.e. sequentially). For example, in a client-server environment file data received at the application layer of a client or a server must be in-order before it can be processed. This is because the client-server environment expects received data to be in order. While communication transferred over a computer network according to the Transmission Control Protocol (TCP) will re-order packets, communications over other transport layer protocols, such as the User Datagram Protocol (UDP) do not.

Typically in a client-server environment a server will send a data set or a file sequentially from the application layer to the transport layer, the transport layer may then send that data to the network layer. The network layer then packetizes the data and sends a plurality of packets to a client. Even though the packetized data may be sent out of order, data contained in the packets will be re-ordered before that data is received at the application layer at the client. Because of this, application layers at a client or a server in a client-server environment may never receive file data that is out of order.

Peer to peer (P2P) networks, however, do not operate in the same way as a client-server environment. For example P2P networks may receive data at an application layer that is out of order. This is because P2P networks fundamentally have a different type of architecture as compared to a client-server environment.

In a P2P network a computer accessing file data may receive parts of data from a file from a plurality of computers. A P2P network is capable of transmitting file data in pieces where each piece of data may be transmitted from a different computer. Because of this a first piece of data received from a first computer may be out of order as compared to a second piece of data received from a second computer. When this occurs the network layer and the transport layer at a receiving computer will not be aware that the first data piece and the second data piece have been received out of order. This is true even when packetized data sent from the first computer (or the second computer) to the receiving computer have been re-ordered. This is because the network layer and the transport layer at the receiving computer do not check whether application data received from different peer computers are received in order. Conventionally, the network layer and the transport layer are only capable of re-ordering packetized data that has been transmitted from a single source computer to a destination computer.

P2P networks may also break a file into a number of pieces where each piece may include a pre-determined or specific number of blocks. Information relating to a number of pieces that a data file is broken into may be included in metadata (or a metadata file) that is associated with the data file. Once a number of pieces are identified, a file size divided by the number of pieces will correspond to a number of blocks that the file may be broken into in the P2P network.

Limitations included in the network layers and in the transport layers of computers today mean that file data received at an application layer of a computer cannot easily scan the received data for malicious content (such as computer worms, viruses, or other attacking software). Conventionally the scanning of data for malicious content at the application layer in a P2P network either cannot be done reliably or must be done in an inefficient manner. For example, if data from a file is scanned out of order, the scan can miss a virus contained within the data, because malicious content are characterized by a sequential ordered series of characters, not an out of order series of characters. In another example, when the application layer re-orders received data before scanning it, data from the out of order pieces must be stored until the data pieces can be re-ordered and scanned. Thus, the first example is unreliable and the second example is inefficient.

Application data that includes interleaved out of order data received at an application layer of a computer system if scanned in the order received may result in missing malicious content contained within the received interleaved data. Furthermore, data received out of order may also result in scanning software falsely detecting malicious content. For example, when the character sequence of "car" is associated a virus and two pieces of data that were received out of order where a later piece of data ending with the character "c" is scanned before an earlier piece of data that begins with "ar," malicious scanning software will falsely identify that these pieces of data include the virus, when they do not.

What is needed to increase the reliability and efficiency of P2P networks are systems and methods that scan pieces of data received out of order at an application layer without storing and re-ordering data pieces that have been received out of order. What is also needed are systems and methods that scan interleaved data reliably at an application layer. The reliable scanning of received data at an application level increases the reliability of detecting malicious content while reducing the likelihood that malicious content scanning software will falsely associate received data with malicious content.

SUMMARY OF THE PRESENTLY CLAIMED INVENTION

The presently claimed invention relates to an apparatus, a method, and a non-transitory computer readable storage medium for deep packet inspection scanning at an application layer of a computer. A method of the presently claimed invention may receive a portion of data at an application layer of a computer system after which the received portion of data may be scanned from a first input state at the application layer. When the first input state includes a portion of information known to be included in malicious content, the method then identifies that the data set can include malicious content after the received portion of data has been scanned from the first input state.

The presently claimed invention may also be implemented as a non-transitory computer readable storage medium where a processor executing instructions out of a memory receives a portion of data at an application layer of a computer system after which the received portion of data may be scanned from a first input state at the application layer. When the first input state includes a portion of information known to be included in malicious content, the processor executing instructions out of the memory then identifies that the data set can include malicious content after the received portion of data has been scanned from the first input state.

An apparatus of the presently claimed invention may include a network interface that receives information, a memory, and a processor. The processor executing instructions out of the memory then receives a portion of a data set at an application layer. The received portion of data is then scanned at the application layer from a first input state. When the first input state includes a portion of information known to be included in a piece of malicious content, the processor executing instructions out of the memory then identifies that the data set can include malicious content after the received portion of data has been scanned from the first input state.

DETAILED DESCRIPTION

The present disclosure relates to an apparatus, a method, and a non-transitory computer readable storage medium for deep packet inspection scanning at an application layer of a computer. A method of the presently claimed invention may scan data received at an application layer from a first input state. The first input state including information, such as, one or more characters that can be associated with malicious content. The method may then identify that the data set may include malicious content when the first input state combined with the scan of the received data matches a known piece of malicious content.

Figure 1:
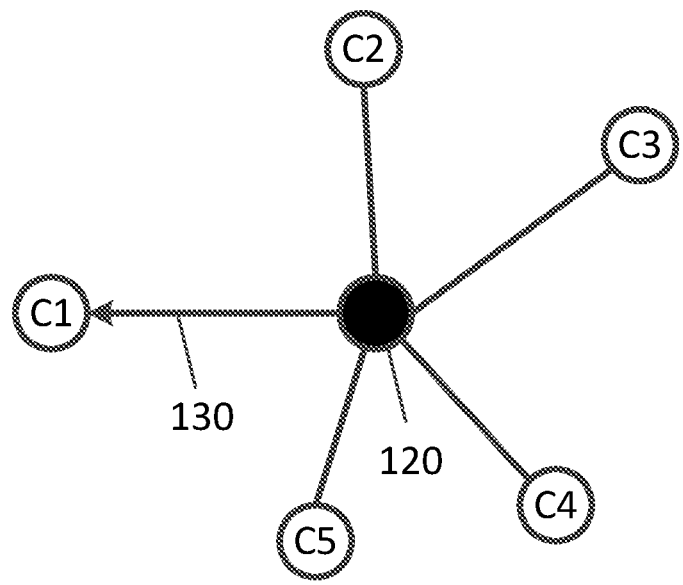
FIG. 1 illustrates computers in a client server environment and computers in a peer to peer network (P2P).
Figure 1:
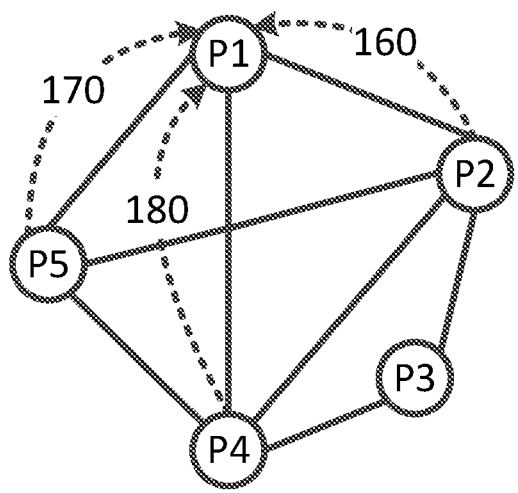

FIG. 1 illustrates computers in a client server environment and computers in a peer to peer network. Client computers C1, C2, C3, C4, and C5 each may communicate with server 120 as indicated by the dark lines connecting each of the client computers with the server 120 in the client server environment 110 of FIG. 1. Line 130 illustrates the server sending data to client computer C1. In client server environment servers send application data directly from the server to a client computer in order.

The peer to peer (P2P) network illustrated 150 in FIG. 1 includes a plurality of peer computers P1, P2, P3, P4, and P5 that may send data directly to each other as illustrated by the dark lines connecting each peer computer with each other peer computer. The dashed lines 160, 170, and 180 illustrate peer computers P2, P4, and P5 sending data to peer computer P1. In a peer to peer computing environment data sent from a number of peer computers to a particular peer computer may be data blocks from a data set or file that the particular peer computer P1 wishes to receive and those data blocks may be received at an application layer on peer computer P1 in an out of order sequence.

Figure 2A:
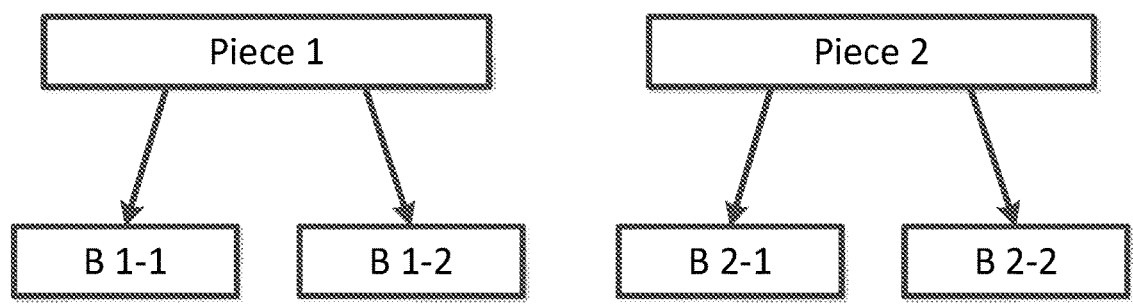
FIG. 2A illustrates an exemplary way in which data parts from a data set may be separated into a plurality of data blocks by computers in a P2P network.

FIG. 2A illustrates an exemplary way in which data parts from a data set may be separated into a plurality of data blocks by computers in a P2P network. A first piece of data Piece 1 from a data set is separated into a first data block B 1-1 and a second data block B 1-2. FIG. 2A also shows a second piece of data Piece 2 from the data set being separated into a first data block B 2-1 and a second data block B 2-2. In a P2P network each of these data blocks may reside at any peer computer in the P2P network. In certain instances one or more data blocks of a data set may be sent to a requesting peer computer from a second peer computer, and other data blocks from the data set may be sent to the requesting peer computer from one or more other peer computers.

Figure 2B:
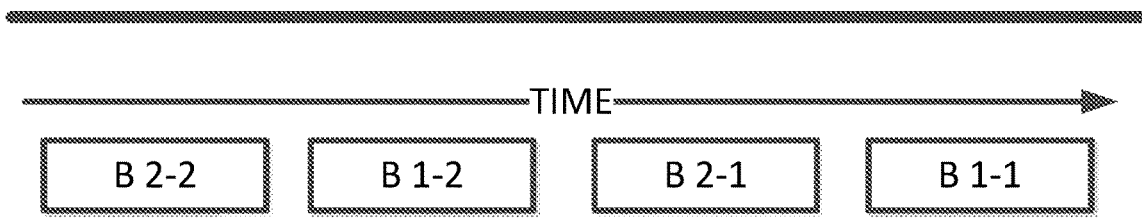
FIG. 2B illustrates data blocks of a data set that are received out of order at a peer computer.

FIG. 2B illustrates data blocks of a data set that are received out of order at a peer computer. Note that time in FIG. 2B moves forward from left to right along the "TIME" line in FIG. 2B. The ordering of received data blocks of FIG.

2B are: B 2-2, B 1-2, B 2-1, and B 1-1, where the in sequence order of these data blocks are B 1-1, B 1-2, B 2-1, and B 2-2.

Figure 3:
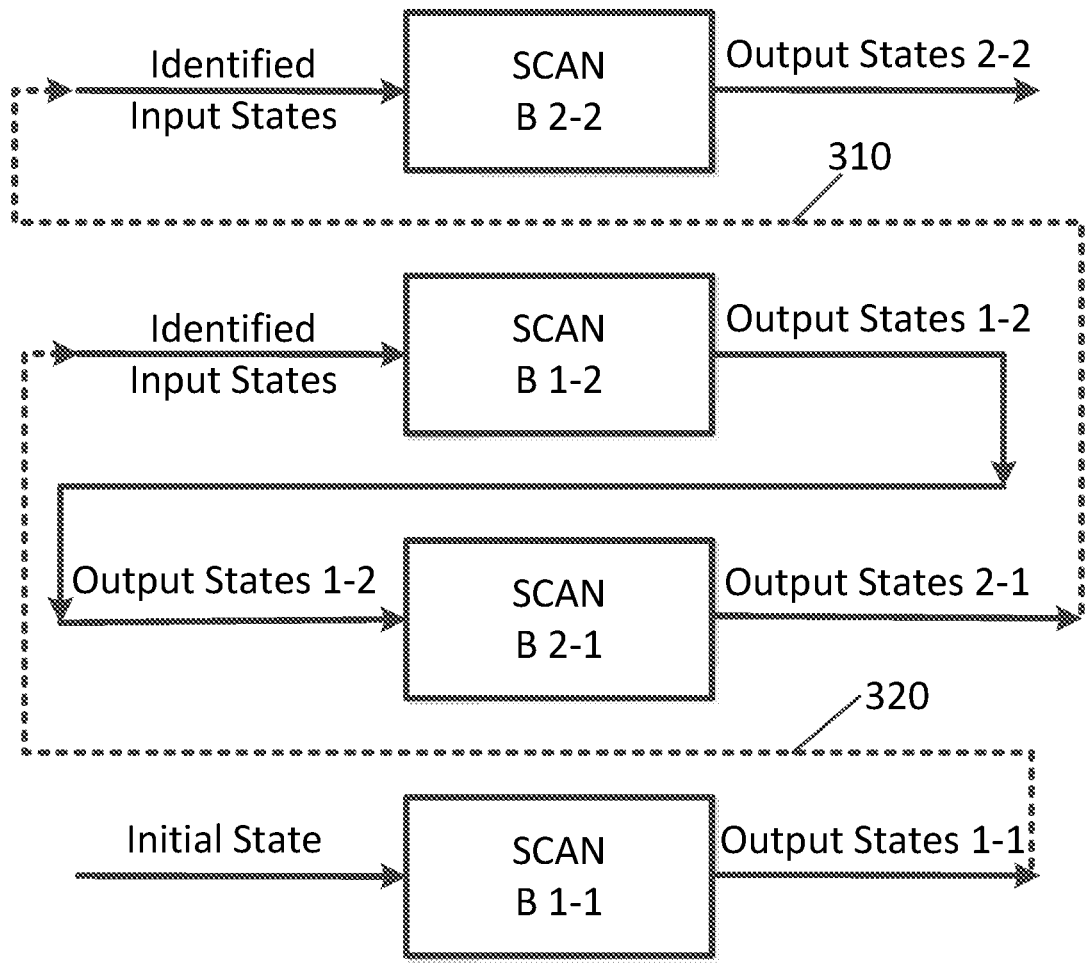
FIG. 3 illustrates an exemplary sequence that data blocks that were received out of order at an application layer may be scanned for malicious content without re-ordering and reassembling those data blocks.

FIG. 3 illustrates an exemplary sequence that data blocks that were received out of order at an application layer may be scanned for malicious content without re-ordering and reassembling those data blocks. Here again the data blocks are received in the out of order sequence of B 2-2, B 1-2, B 2-1, and B 1-1. Each of the received data blocks are scanned in a manner where each data block scanned has identified input states and output states. The identified input states may include a state for each and every possible state that might be associated with malicious content. Identified input states include one or more characters in a sequence of characters that match content known to be associated with malicious content.

For example, when malicious content is identified as receiving the character "c" followed by character "a" that is, in turn, followed by character "r," then the identified input states associated with malicious content include state "c" and the state "ca." In the instance where a preceding data block ends with characters "ca" and a following data block begins with the character "r," then malicious code "car" is present in these data blocks. Similarly in the instance where the preceding data block ends with the character "c" and the following data block begins with characters "ar," then the malicious code "car" is also present in these data blocks. Malicious content "car" may correspond to a rule that identifies "car" as being malicious content.

In the instance where characters "car" are associated with malicious code by a rule when data block B 2-2 is received and when data block B 2-1 has not yet been received (as in FIG. 3.). Identified input states an empty string, "c," and "ca" will then be used when identifying whether data blocks B 2-2 and B 2-1 can include the malicious code "car."

In an apparatus consistent with the presently disclosed invention, malicious code can be associated with one or more different sequences of characters. For example, the character sequence of "Apple" may also be associated with malicious content via a rule (R2) that identifies "Apple" as being a virus. In the instance when "Apple" is associated with malicious content, identified input states (sub-states) may include an empty string " ", "A," "Ap," "App," and "Appl.".

After data block B 2-2 is scanned using each of the identified input states in FIG. 3, the scanning process outputs output states 2-2. Output states 2-2 may then be stored in memory for later use. Since the next data block received in FIG. 3 is B 1-2 and since data block B 1-1 has not yet been scanned, the scanning process once again inputs the identified input states when scanning data block B 1-2, and the scanning process outputs output states 1-2. Output states 1-2 may then be stored in memory for later use. FIG. 3 then shows data block B 2-1 being received. Note that data block B 1-2 in FIG. 3 has already been scanned and that output states 1-2 may be input into the scanning process of data block B 2-1 from the memory. This is because these two data blocks include contiguous (ordered) data and because output states 1-2 were previously stored in memory. The outputs of the scanning process of data block B 2-1 are output states 2-1. The dotted line 310 in FIG. 3 indicates that the output states 2-1 may be compared with the identified input states. Any output state 2-1 that matches an identified input state may then be used to identify whether the combined data blocks 1-2 and 2-1 include malicious content. The process of storing output states of a scanned data block and correlating those output states to identified input states that may be included in a subsequently received, previously ordered data piece reduces an amount of memory required to identify malicious content in a data set. This is because once an output state from a second piece of data has been identified, a number of identified input states relating to a not yet received first piece of data may be reduced. For example, the second piece of data has the output state "ca," the identified input states that can include malicious content of "car" are limited to one possible identified input state of "r." In such instances identified input states including "c," "a," "A," "Ap," "App," and "Appl" may be eliminated from concern when "car" and "Apple" are each associated with rules that identify malicious content. As such, the storing of output states of a previously scanned data block combined with correlating those output states with identified input states that may be included in a subsequently received, previously ordered data block may be referred to as a "reduction phase" consistent with the present disclosure. Processing phases of the present disclosure related to the scanning of a data block may be referred to as a "scanning phase" of the present disclosure. Reduction phases and scanning phases may, thus, reduce memory utilization and increase the efficiency of a computer.

Finally after data block B 1-1 is received, data block B 1-1 may be scanned from an initial state (such as a null state) and output states 1-1 may be output. The dotted line 320 indicates that output states 1-1 may be compared with the identified input states when identifying whether the combined data blocks B 1-2 and B 2-1 include malicious content. Note that this process scans data blocks received out of order for malicious content without reassembling the data blocks. Instead a series of identified input states may be used when scanning an out of order packet for malicious content. The presently disclosed invention, thus, identifies malicious content by comparing output states with identified input states that may be included in a data block that has not yet been received. Later when the out of order data block is received, the out of order data block may be scanned generating one or more output states. When an output state of the out of order packet includes an identified input state of a subsequently ordered data block, the two different data blocks may include malicious content.

In certain instances one or more output states associated with different pieces of a data set may be stored in memory where each of these output states may be associated with a possible identified input state associated with yet other pieces of the data set. When one or more output states and one or more possible identified input states are stored in memory and an outstanding piece of the data set is received, the outstanding piece of the data set may be scanned generating an output state associated with the outstanding piece of the data set. In such an instance, each of the output states and possible identified input states may be assembled in a chain when identifying that the data set includes malicious content.

For example, when data blocks are received in the order illustrated in FIG. 3 (i.e.: B 2-2, B 1-2, B 2-1, and B 1-1) where data block B 2-2 consists of "pple," data block B 1-2 consists of "aaaa," B 2-1 consists of "araA," and data block B 1-1 consists of "Appc." First data block B 2-2 is scanned using the identified input states (i.e. all possible input states that correspond to malicious content) generating output states 2-2. Since data block B 2-2 consists of "pple," output states 2-2 may identify that the identified input state of "A" from the not yet received data block B 2-1 will indicate that malicious content of "Apple" spans data block B 2-1 and B 2-2 when data block B 2-1 ends with the character "A."

Since data block B 2-1 has not yet been received, output states 2-2 will identify that the identified input state of "A" preceding data block B 2-2 corresponds to malicious content "Apple."

Next data block B 1-2 is scanned using the identified input states generating output states 1-2. When rules that identify malicious content as being "car" and "Apple" the character sequences an empty string (i.e. an initial state), "c," "ca", "A," "Ap," "App," and "Appl" each are identified input states that are associated with malicious content. Since data block B 1-2 consists of "aaaa," the only output state that corresponds to an identified input state that may be associated with malicious content is the empty string (i.e. an initial state). This is because the character sequences of "a," "aa," "aaa," and "aaaa" are not associated with malicious content according to rules that identify "Apple" and "car" as being malicious content. This means that data block B 2-1 may be scanned from just the empty string. Thus, in this example, the process of reduction identifies that the only identified input state of all of the identified input states that data block B 2-1 should be scanned from is the empty string.

When data block B 2-1 is received, it is scanned from only the empty string. After data block B 2-1 is scanned, output states 2-1 will be generated. Since data block B 2-1 consists of "araA," the only output state that corresponds to an identified input state is the identified output state of "A." Since data block B 2-2 has already been scanned and identified as including "pple," malicious content of "Apple" will be detected in the data set when preceding data block B 2-1 ends with the character "A." Since, in this example, the identified input state of "A" precedes data block B 2-2, the malicious content of "Apple" is detected in the data set. Once malicious content has been detected in the data set, the receipt of additional data blocks, such as data block B 1-1, may be blocked. Note also that a chain of only one possible identified input state of "A" of data block B 2-2 and the output state "pple" of output states 2-2 are used to identify malicious content in this example. Note also that only a reduced number of input states coupled with a number of output states 2-2 requires limited storage as compared to storing the data blocks received.

The present disclosure is not limited to malicious content spanning one or two data blocks, as methods consistent with the present disclosure may detect malicious content that spans any number of data blocks in a data set, including all of the data blocks.

Figure 4:
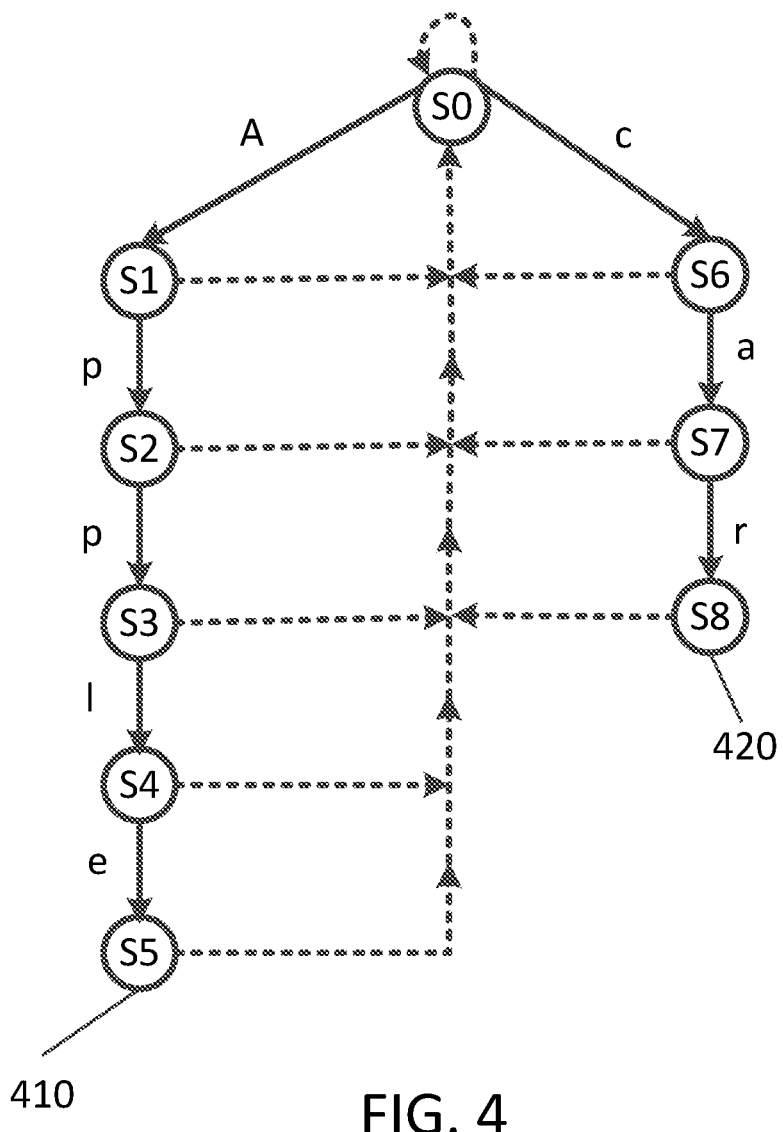
FIG. 4 illustrates a state mapping that includes malicious content.

FIG. 4 illustrates a state mapping that includes malicious content. Whether the mapping moves from one particular state to another particular state depends on the sequence of characters in the data set. FIG. 4 illustrates a mapping that moves from an initial state of S0 to state S1 when the character "A" is scanned in a data set. FIG. 4 also shows the mapping moving from state S0 to state S6 when the character "c" is scanned in the data set. When the state map is in state S0 and the next character input is not an "A" or a "c," the mapping will stay in state S0. FIG. 4 identifies two different rules that identify malicious content. Here the first rule identifies that the character sequence of "Apple" is associated with malicious content and the second rule identifies that the character sequence "car" is associated malicious content.

FIG. 4 also illustrates the state mapping moving consistent with the present disclosure. FIG. 4 illustrates a state mapping moving from state S1 to state S2 when a "p" is scanned after an "A," moving from state S2 to S3 when a second "p" is scanned, moving from state S3 to S4 when an "l" is scanned, and moving from state S4 to S5 when an "e" is scanned. Note that state S5 is identified as item 410. Item 410 indicates that the malicious content "Apple" has been identified according to the first rule in the data set.

Similarly state flow may move from state S0 to state S6 when the character "c" is in the data set, then moves to state S7 when a subsequent character "a" is encountered in sequence in the data set, and then moves from state S7 to state S8 when a subsequent character "r" is in the data set. Note that state S8 is identified as item 420 in FIG. 4. Item 420 indicates that malicious content "car" has been detected in the data set. Here again each character "c," "a," and "r" must be sequential characters in the data set for the state mapping to reach state S8. Whenever a next character identified in the data set does not follow the state mapping, the mapping will move from a current state to state S0. When the state mapping moves from state S6 or S7 to state S0 (as indicated by the dotted lines in FIG. 4), malicious content has not been detected in the data set. After state S8 the state mapping moves back to initial state S0.

Dashed lines in FIG. 4 illustrate the state mapping moving from each of states S1, S2, S3, S4, and S5 back to state S0. In order to reach state S5 each of characters "A," "p," "p," "l," and "e" must occur in order in the data set. When a character in the data set does not agree with the state mapping, malicious content is not detected in the data set and the state mapping moves back to state S0.

Figure 5:
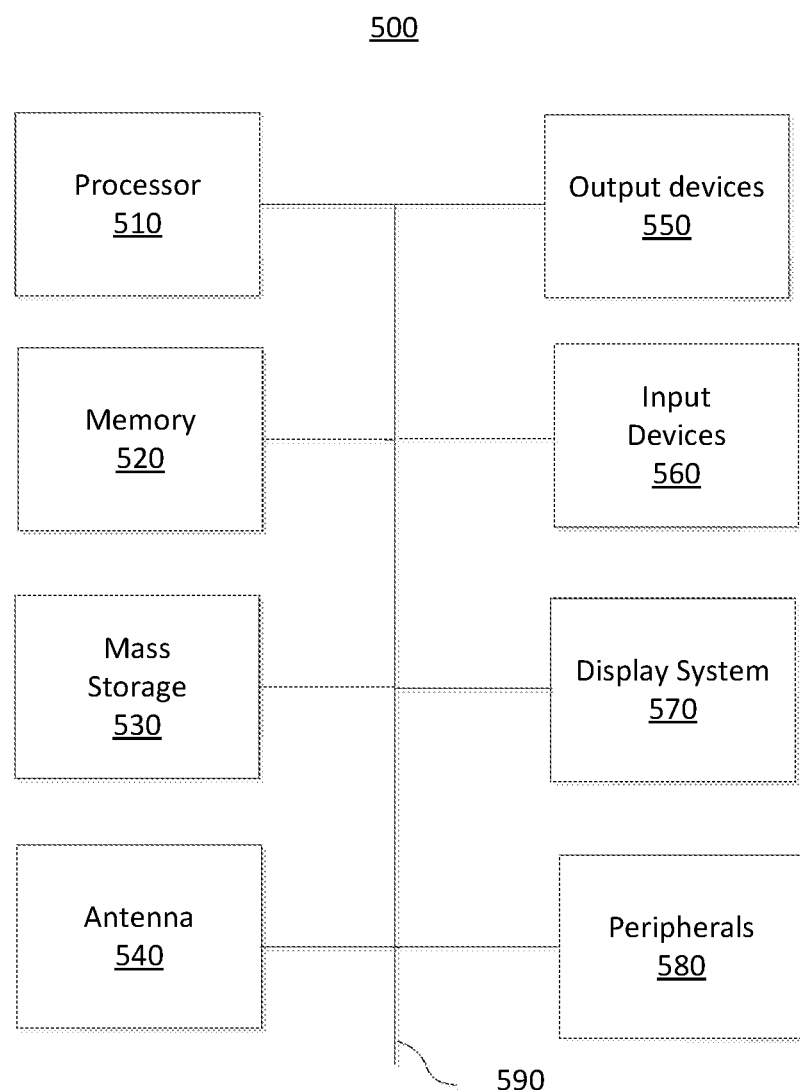
FIG. 5 is a block diagram of a device for implementing the present technology.

FIG. 5 is a block diagram of a device for implementing the present technology. FIG. 5 illustrates an exemplary computing system 500 that may be used to implement a computing device for use with the present technology. The computing system 500 of FIG. 5 includes one or more processors 510 and memory 520. Main memory 520 may store, in part, instructions and data for execution by processor 510. Main memory can store the executable code when in operation. The system 500 of FIG. 5 further includes a storage 520, which may include mass storage and portable storage, antenna 540, output devices 550, user input devices 560, a display system 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the storage 530, peripheral device(s) 580 and display system 570 may be connected via one or more input/output (I/O) buses.

Storage device 530, which may include mass storage implemented with a magnetic disk drive or an optical disk drive, may be a non-volatile storage device for storing data and instructions for use by processor unit 510. Storage device 530 can store the system software for implementing embodiments of the present invention for purposes of loading that software into main memory 510.

Portable storage device of storage 530 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device.

Antenna 540 may include one or more antennas for communicating wirelessly with another device. Antenna 540 may be used, for example, to communicate wirelessly via Wi-Fi, Bluetooth, with a cellular network, or with other wireless protocols and systems. The one or more antennas may be controlled by a processor 510, which may include a controller, to transmit and receive wireless signals. For example, processor 510 execute programs stored in memory 520 to control antenna 540 transmit a wireless signal to a cellular network and receive a wireless signal from a cellular network.

The system 500 as shown in FIG. 5 includes output devices 550 and input device 560. Examples of suitable output devices include speakers, printers, network interfaces, and monitors. Input devices 560 may include a touch screen, microphone, accelerometers, a camera, and other device. Input devices 560 may include an alpha-numeric keypad, such as a keyboard, for inputting alpha-numeric and other information, or a pointing device, such as a mouse, a trackball, stylus, or cursor direction keys.

Display system 570 may include a liquid crystal display (LCD), LED display, or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Actions taken when the content included in a data set or file received at an application level at a peer device may vary and may depend on one or more actions identified by a user of the peer computer. In certain instances, user preferred actions may be selected in a user interface displayed on a display at the peer computer. In other instances actions taken after detecting malicious content may be according to a set of pre-defined or default actions set in an application program. Actions that may be taken after detecting malicious content in a data set include, yet are not limited to marking the data set or file as including malicious content, blocking reception of data associated with the data set or file, and resetting one or more TCP connections associated with the data set or file.

When the data set or file is marked as including malicious content, that marking may be stored in a table or database at the peer computer that received and detected the malicious data. The data set or file may be identified by a name (i.e. by a filename) or may be identified using a Hash function or checksum of information that identifies the data set. Once a data file has been identified subsequent attempts to download the file may be blocked.

Hash functions identifying a data set or file may be generated from metadata downloaded from a peer when downloading a portion of a data set. In certain instances the downloaded metadata may include a peer identifier, an internet protocol (IP) address, a domain name, or a port number.

As soon as a file is identified as being associated with malicious content, one or more communication sessions associated with the file may be reset. This may include resetting communications sessions between a plurality of peer computers that are providing parts of the file.

The presently disclosure is not limited to files received over a peer to peer network as file data received in an interleaved (out of order) sequence at the application level may also be scanned according to the present disclosure. For example, interleaved data received using the server message block (SMB) 2.0 standard may be scanned in order without reassembly at the application layer of a computer for malicious content.

Embodiments of the present disclosure may be implemented by a non-transitory computer readable storage medium by a processor executing instructions out of a memory, by a DPI scanner implemented in a field programmable gate array (FPGA).

The presently disclosed invention may be implemented in software (i.e. as a non-transitory computer readable storage medium executable by a processor), may be implemented in whole or in part in a field programmable gate array, may be implemented in whole or in part in a hardware state machine, or may be implemented in a combination of hardware and software.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for deep packet inspection scanning in a peer-to-peer (P2P) network, the method comprising:

transmitting a request sent from a first computer to a plurality of peer computers in communication with the first computer in the P2P network, wherein the first computer is requesting a file that includes a dataset to be received on an application layer;

receiving a first portion of the file at the application layer of the P2P network in an out-of-order sequence from a first peer computer of the plurality of peer computers in response to the request, wherein the first portion of the file is received at a first time period;

generating a first output state based on a scan of the first portion of the file received in the out-of-order sequence at the application layer of the P2P network, wherein the first portion is scanned for a correlation to malicious content stored in memory;

receiving a second portion of the file sent at the application layer of the P2P network in an out-of-order sequence from a second peer computer of the plurality of peer computers, wherein the second portion is received at a second time period;

scanning the second portion preceding the first portion at the application layer of the P2P network from a second input state without reassembly, wherein scanning of the second out-of-order portion of the dataset generates a second output state; and resetting one or more communications sessions associated with one or more of the peer computers that are providing parts of the file based on the second output state indicating a match to the malicious content.

2. The method of claim 1, wherein the correlation is based on a match to one or more parts of the malicious content stored in the memory.

3. The method of claim 1, wherein generating the first output state is based on at least one previously identified input state associated with the correlation to the malicious content.

4. The method of claim 1, further comprising generating the second output state, and determining that the second input state indicates the match to the malicious content.

5. The method of claim 1, further comprising blocking data from being sent to a destination device based on the match to the malicious content.

6. The method of claim 1, wherein the first input state indicates that one or more characters in a sequence of characters match the malicious content.

7. The method of claim 1, further comprising storing a state mapping in the memory that identifies a plurality of states associated with the malicious content, wherein the state mapping associates each of the states with a set of characters.

8. A non-transitory computer-readable storage medium having embodied thereon a program executable by a processor to implement a method for deep packet inspection scanning in a peer-to-peer (P2P) network, the method comprising:

transmitting a request sent from a first computer to a plurality of peer computers in communication with the first computer in the P2P network, wherein the first computer is requesting a file that includes a dataset to be received on an application layer;

receiving a first portion of the file at the application layer of the P2P network in an out-of-order sequence from a first peer computer of the plurality of peer computers in response to the request, wherein the first portion of the file is received at a first time period;

generating a first output state based on a scan of the first portion of the file received in the out-of-order sequence at the application layer of the P2P network, wherein the first portion is scanned for a correlation to malicious content stored in memory;

receiving a second portion of the file sent at the application layer of the P2P network in an out-of-order sequence from a second peer computer of the plurality of peer computers, wherein the second portion is received at a second time period;

scanning the second portion preceding the first portion at the application layer of the P2P network from a second input state without reassembly, wherein scanning of the second out-of-order portion of the dataset generates a second output state; and resetting one or more communications sessions associated with one or more of the peer computers that are providing parts of the file based on the second output state indicating a match to the malicious content.

9. The non-transitory computer-readable medium of claim 8, wherein the correlation is based on a match to one or more parts of the malicious content stored in the memory.

10. The non-transitory computer-readable medium of claim 8, wherein generating the first output state is based on at least one previously identified input state associated with the correlation to the malicious content.

11. The non-transitory computer-readable storage medium of claim 8, further comprising instructions executable to generate the second output state, and determining that the second input state indicates the match to the malicious content.

12. The non-transitory computer-readable storage medium of claim 8, further comprising instructions executable to block data from being sent to a destination device based on the match to the malicious content.

13. The non-transitory computer-readable medium of claim 8, wherein the first input state indicates that one or more characters in a sequence of characters match the malicious content.

14. The non-transitory computer-readable storage medium of claim 8, further comprising instructions executable to store a state mapping in the memory that identifies a plurality of states associated with the malicious content, wherein the state mapping associates each of the states with a set of characters.

15. A system for deep packet inspection scanning in a peer-to-peer (P2P) network, comprising:

an analysis computer operatively connected to a computer network, the analysis computer configured to:

transmit a request sent from a first computer to a plurality of peer computers in communication with the first computer in the P2P network, wherein the first computer is requesting a file that includes a dataset to be received on an application layer;

receive a first portion of the file at the application layer of the P2P network in an out-of-order sequence from a first peer computer of the plurality of peer computers in response to the request, wherein the first portion of the file is received at a first time period;

generate a first output state based on a scan of the first portion of the file received in the out-of-order sequence at the application layer of the P2P network, wherein the first portion is scanned for a correlation to malicious content stored in memory;

receive a second portion of the file sent at the application layer of the P2P network in an out-of-order sequence from a second peer computer of the plurality of peer computers, wherein the second portion is received at a second time period;

scan the second portion preceding the first portion at the application layer of the P2P network from a second input state without reassembly, wherein scanning of the second out-of-order portion of the dataset generates a second output state; and reset one or more communications sessions associated with one or more of the peer computers that are providing parts of the file based on the second output state indicating a match to the malicious content.

16. The system of claim 15, wherein the correlation is based on a match to one or more parts of the malicious content stored in the memory.

17. The system of claim 15, wherein the analysis computer is further configured to generate the first output state based on at least one previously identified input state associated with the correlation to the malicious content.

18. The system of claim 15, wherein the analysis computer is further configured to generate the second output state, and determine that the second input state indicates the match to the malicious content.

19. The system of claim 15, wherein the analysis computer is further configured to block data from being sent to a destination device based on the match to the malicious content.

20. The system of claim 15, wherein the first input state indicates that one or more characters in a sequence of characters match the malicious content.

21. The system of claim 15, wherein the analysis computer is further configured to store a state mapping in the memory that identifies a plurality of states associated with the malicious content, wherein the state mapping associates each of the states with a set of characters.

* * * * *